(12) United States Patent
Solomon et al.

(10) Patent No.: US 7,874,794 B2
(45) Date of Patent: Jan. 25, 2011

(54) BLADE ROW FOR A ROTARY MACHINE AND METHOD OF FABRICATING SAME

(75) Inventors: William J. Solomon, Cincinnati, OH (US); Daniel A. Wilkin, II, West Chester, OH (US); Andrew Breeze-Stringfellow, Montgomery, OH (US); Kevin S. Hansell, Okeana, OH (US)

(73) Assignee: General Electric Company, Schenectady, NY (US)

( * ) Notice: Subject to any disclaimer, the term of this patent is extended or adjusted under 35 U.S.C. 154(b) by 451 days.

(21) Appl. No.: 11/385,205

(22) Filed: Mar. 21, 2006

(65) Prior Publication Data

US 2007/0224038 A1    Sep. 27, 2007

(51) Int. Cl.
*F01D 9/04* (2006.01)
(52) U.S. Cl. .................. 415/191; 415/914; 416/175
(58) Field of Classification Search ............... 415/914, 415/195
See application file for complete search history.

(56) References Cited

U.S. PATENT DOCUMENTS

| 821,347 | A | * | 5/1906 | Elling | 415/195 |
|---|---|---|---|---|---|
| 2,735,612 | A | | 2/1956 | Hausmann | |
| 3,529,631 | A | * | 9/1970 | Riollet | 415/914 |
| 4,305,248 | A | * | 12/1981 | Wright | 415/914 |
| 4,420,288 | A | * | 12/1983 | Bischoff | 415/914 |
| 4,465,433 | A | * | 8/1984 | Bischoff | 416/223 A |
| 5,299,914 | A | * | 4/1994 | Schilling | 416/203 |
| 5,397,215 | A | | 3/1995 | Spear et al. | |
| 5,667,361 | A | * | 9/1997 | Yaeger et al. | 416/203 |
| 6,017,186 | A | | 1/2000 | Hoeger et al. | |
| 6,283,713 | B1 | | 9/2001 | Harvey et al. | |
| 6,471,482 | B2 | * | 10/2002 | Montgomery et al. | 416/203 |
| 6,561,761 | B1 | | 5/2003 | Decker et al. | |
| 6,669,445 | B2 | | 12/2003 | Staubach et al. | |
| 6,837,679 | B2 | | 1/2005 | Kawarada et al. | |
| 6,969,232 | B2 | * | 11/2005 | Zess et al. | 415/191 |

FOREIGN PATENT DOCUMENTS

| JP | 52054808 A | * | 5/1977 |
|---|---|---|---|
| JP | 56118502 A | * | 9/1981 |

OTHER PUBLICATIONS

English Translation of JP 52-54808 A. FLS, Inc. Jul. 2009. pp. 1-22.*

* cited by examiner

*Primary Examiner*—Richard Edgar
(74) *Attorney, Agent, or Firm*—William Scott Andes, Esq.; Armstrong Teasdale LLP

(57) ABSTRACT

A blade row for a rotary machine includes a radially inner endwall, a radially outer endwall having a radially inner surface, and an airfoil including a root section coupled to the inner endwall and a tip section coupled to the outer endwall such that the airfoil extends radially between the inner and outer endwalls. The radially outer endwall includes a projection extending radially inward from the outer endwall inner surface such that the outer endwall inner surface includes a non-axisymmetric shape.

11 Claims, 6 Drawing Sheets

BLADE ROW FOR A ROTARY MACHINE AND METHOD OF FABRICATING SAME

BACKGROUND OF THE INVENTION

The present invention relates generally to rotary machines, and more specifically to blade rows for rotary machines and methods for fabricating blade rows for rotary machines.

Gas turbine engines typically include a compression system for compressing a working fluid, such as air. At least some known compression systems consist of a single rotating compressor, while other known compression systems include multiple stages of rotating compressors. Compressed fluid from the compression system is channeled into a combustor wherein it is mixed with fuel and ignited to generate combustion gases which are channeled to a turbine. The turbine extracts energy from the combustion gases to power the compressor, as well as to produce useful work for propelling an aircraft in flight, or powering a load, such as, but not limited to, an electrical generator or a ship propeller.

At least some known compression systems include stationary inlet guide vane (IGV) assemblies for channeling fluid flow into one or more compressors of compression system and stationary outlet guide vane (OGV) assemblies for channeling fluid flow out of one or more compressors. At least some known IGV and OGV assemblies include a plurality of circumferentially-spaced airfoils, sometimes referred to as vanes, extending radially between an inner wall and an outer wall. Each airfoil adjusts an angular velocity of the working fluid before it enters or after it exits one or more compressors. Span-wise modifications to a sweep, dihedral, and/or camber of at least some known vane assembly airfoils have been made to increase the efficiency of the vane assembly and/or to prevent separation of the working fluid from the airfoils as the fluid is channeled through the assembly. However, span-wise modifications to airfoil sweep, dihedral, and/or camber may sometimes be constrained by structural design and/or noise considerations.

BRIEF DESCRIPTION OF THE INVENTION

In one aspect, a blade row for a rotary machine includes a radially inner endwall, a radially outer endwall having a radially inner surface, and an airfoil including a root section coupled to the inner endwall and a tip section coupled to the outer endwall such that the airfoil extends radially between the inner and outer endwalls. The radially outer endwall includes a projection extending radially inward from the outer endwall inner surface such that the outer endwall inner surface includes a non-axisymmetric shape.

In another aspect, a rotary machine includes a rotor assembly having an axis of rotation. The rotary machine also includes a blade row. The blade row includes a radially inner endwall, a radially outer endwall including a radially inner surface, and an airfoil including a root section coupled to the inner endwall and a tip section coupled to the outer endwall such that said airfoil extends radially between the inner and outer endwalls. The radially outer endwall includes a projection extending radially inward from the outer endwall inner surface such that the outer endwall inner surface includes a non-axisymmetric shape with respect to the axis of rotation.

In another aspect, a method is provided for fabricating a blade row for a rotary machine. The method includes providing an airfoil having a root section coupled to a radially inner endwall and a tip section coupled to a radially outer endwall, and forming a projection extending radially inward from a radially inner surface of the outer endwall.

DETAILED DESCRIPTION OF THE INVENTION

Figure 1:
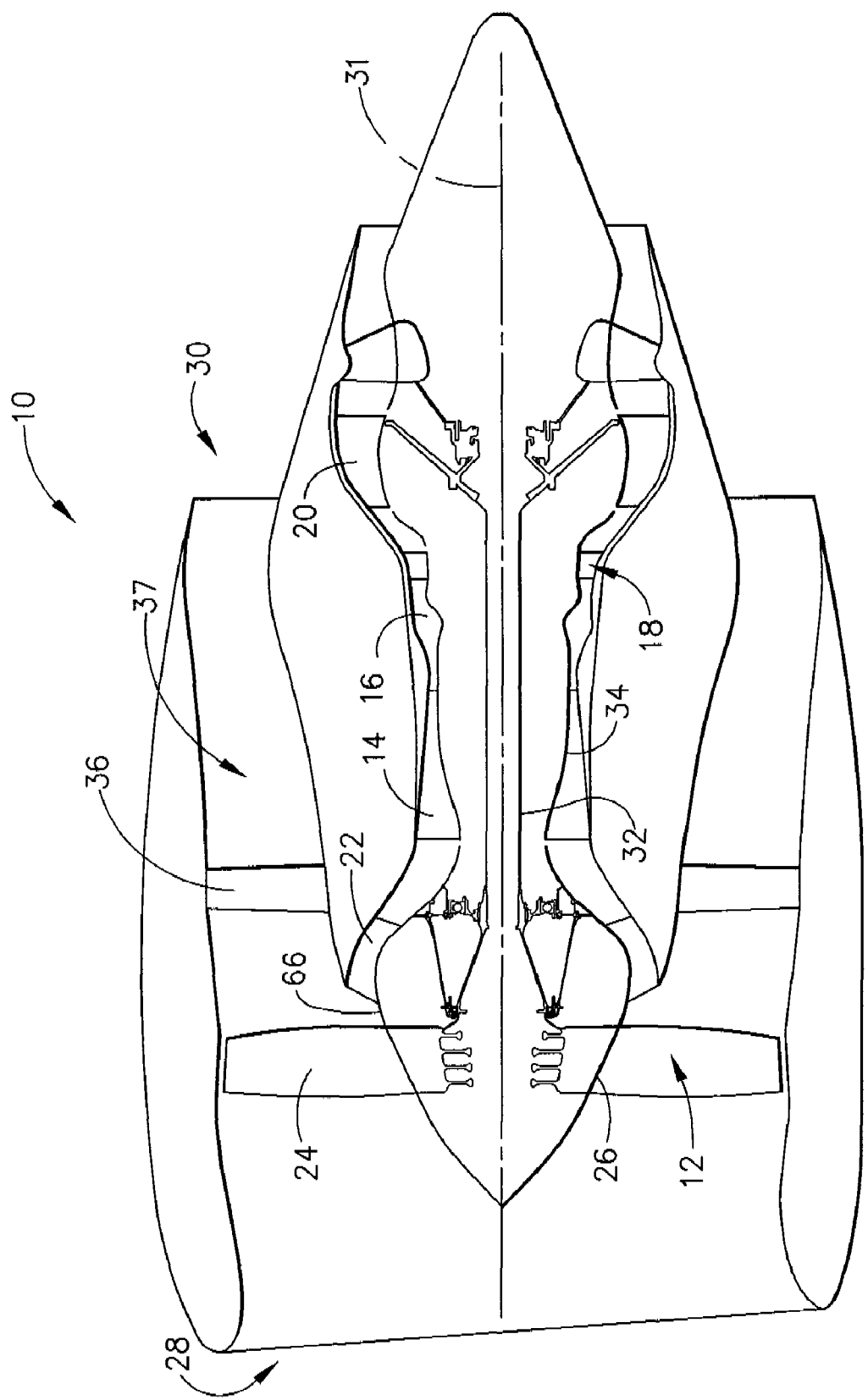
FIG. 1 is a schematic illustration of an exemplary gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28, an exhaust side 30, and a centerline axis 31. In one embodiment, the gas turbine engine is a GE90 available from General Electric Company, Cincinnati, Ohio. Fan assembly 12, booster 22, and turbine 20 are coupled together by a first rotor shaft 32, and compressor 14 and turbine 18 are coupled together by a second rotor shaft 34. In an alternative embodiment, engine 10 includes a low pressure compressor (not shown). Moreover, in an alternative embodiment, engine 10 includes a third rotor shaft (not shown). As should be known by one skilled in the art, fan assembly 12, compressor 14, turbines 18, 20, and booster 22 are rotor assemblies that rotate about engine centerline axis 31.

In operation, air flows through fan assembly 12 and compressed air is supplied to high pressure compressor 14 through booster 22. The highly compressed air is delivered to combustor 16, wherein it is mixed with a fuel and ignited. Combustion gases from combustor 16 drive turbines 18 and 20, and turbine 20 drives fan assembly 12 and booster 22 by way of shaft 32.

Figure 2:
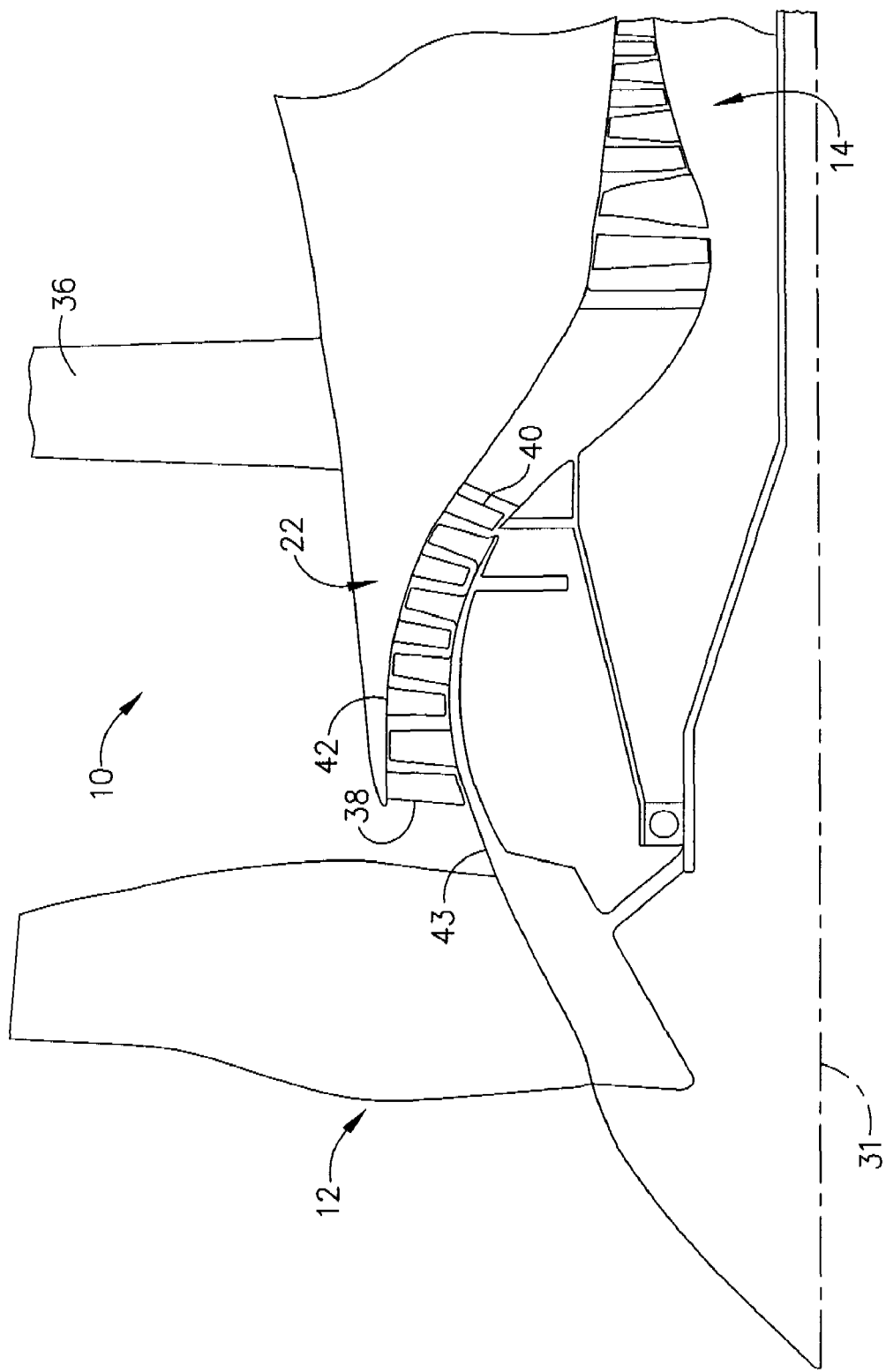
FIG. 2 is a schematic illustration of a portion of the gas turbine engine shown in FIG. 1.

FIG. 2 is a schematic illustration of a portion of gas turbine engine 10. In the exemplary embodiment, fan assembly 12 includes an outlet guide vane (OGV) assembly 36 for channeling airflow from fan assembly 12 downstream through a bypass duct 37 (shown in FIG. 1). Moreover, in the exemplary embodiment, booster 22 includes an inlet guide vane (IGV) assembly 38 for channeling airflow from fan assembly 12 downstream through booster 22, and an OGV assembly 40 for channeling compressed air from booster 22 downstream to high pressure compressor 14. IGV assembly 38 and OGV assembly 40 each extend between an outer structural casing 42 and a center hub 43. In some embodiments, booster 22 also includes a plurality of struts (not shown) which extend between outer structural casing 42 and center hub 43.

Figure 3:
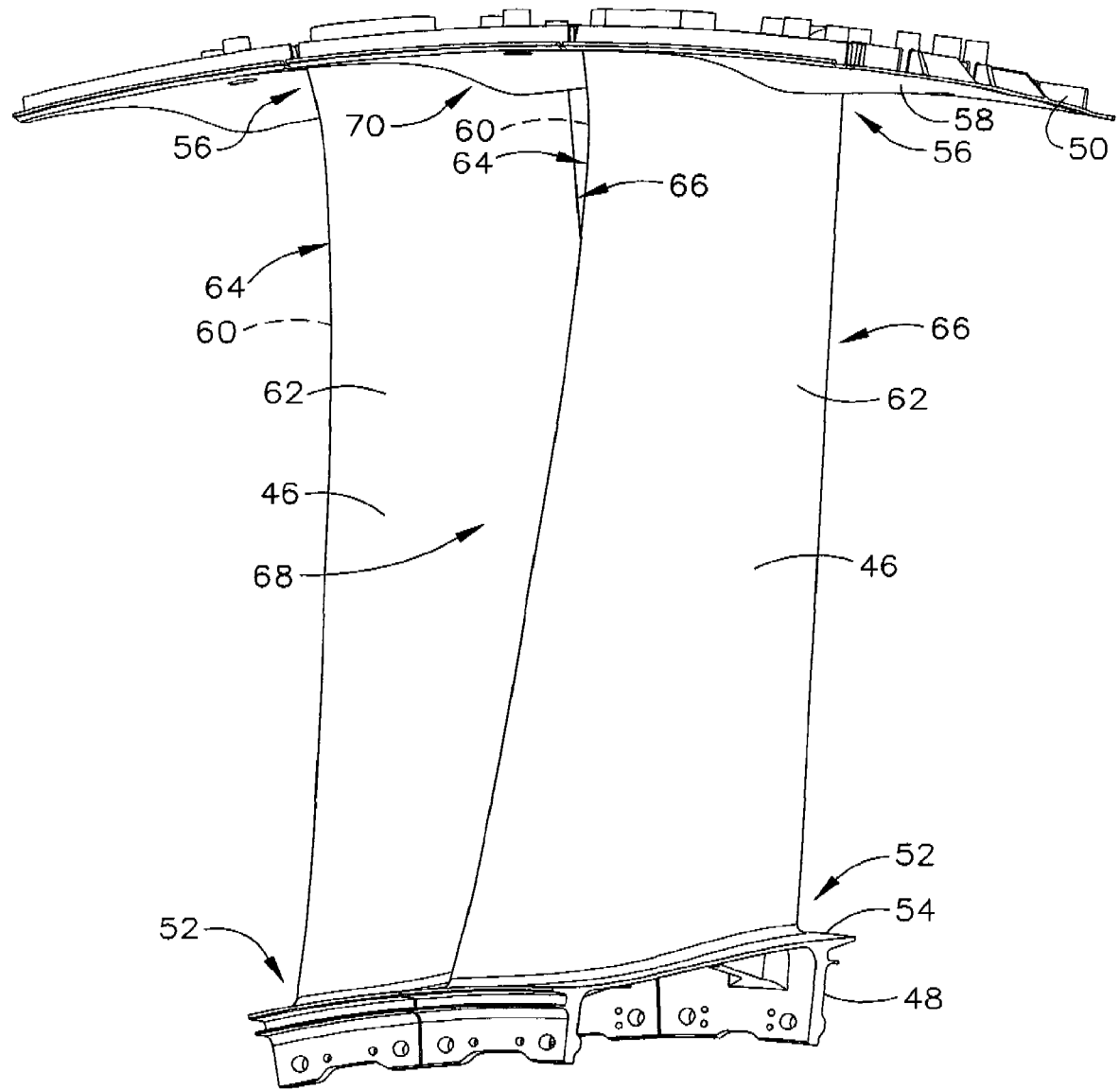
FIG. 3 is a perspective view of a portion of an exemplary embodiment of a blade row that may be used with the gas turbine engine shown in FIGS. 1 and 2.
Figure 4:
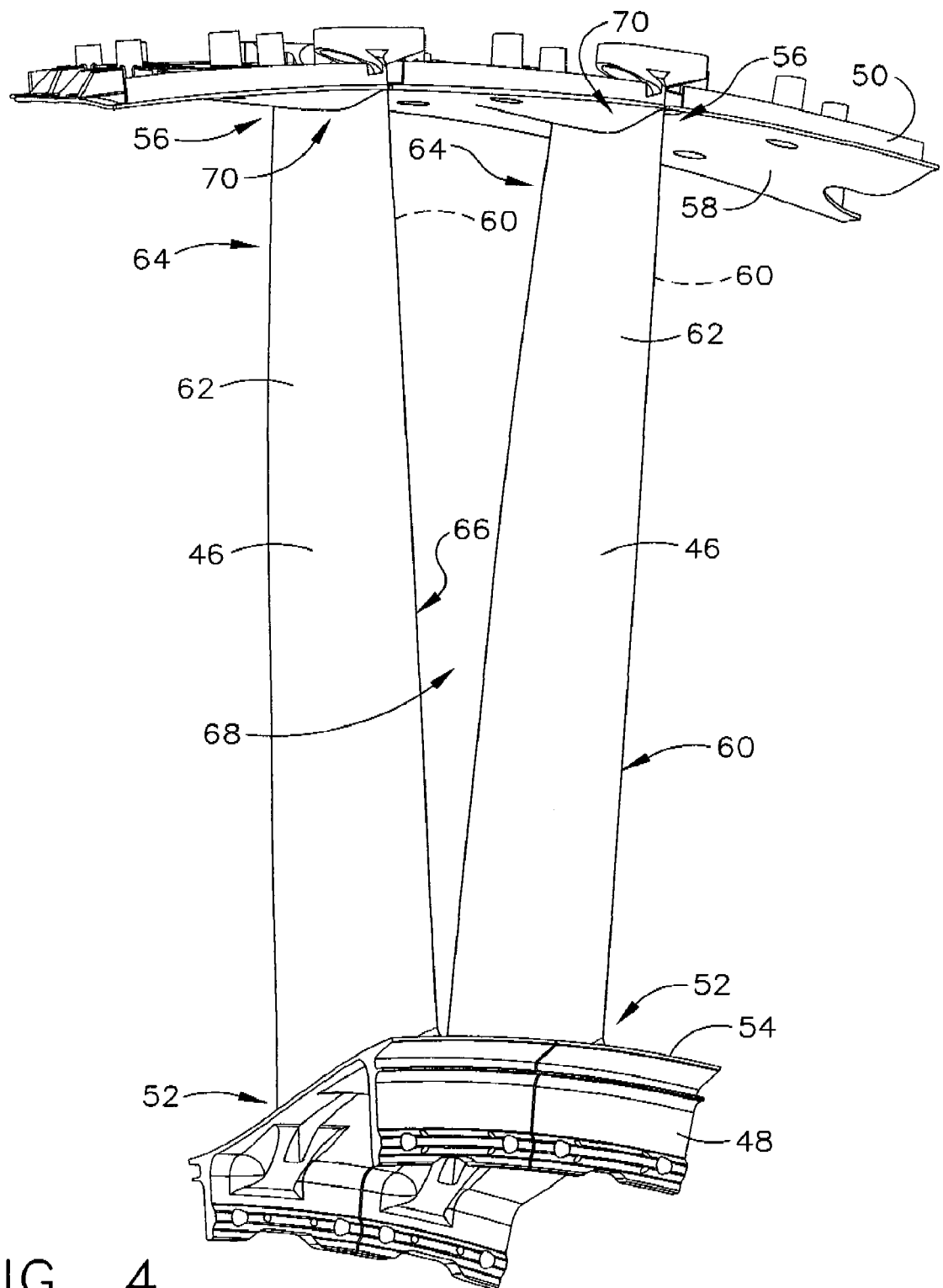
FIG. 4 is another perspective view of the portion of the blade row shown in FIG. 3.
Figure 5:
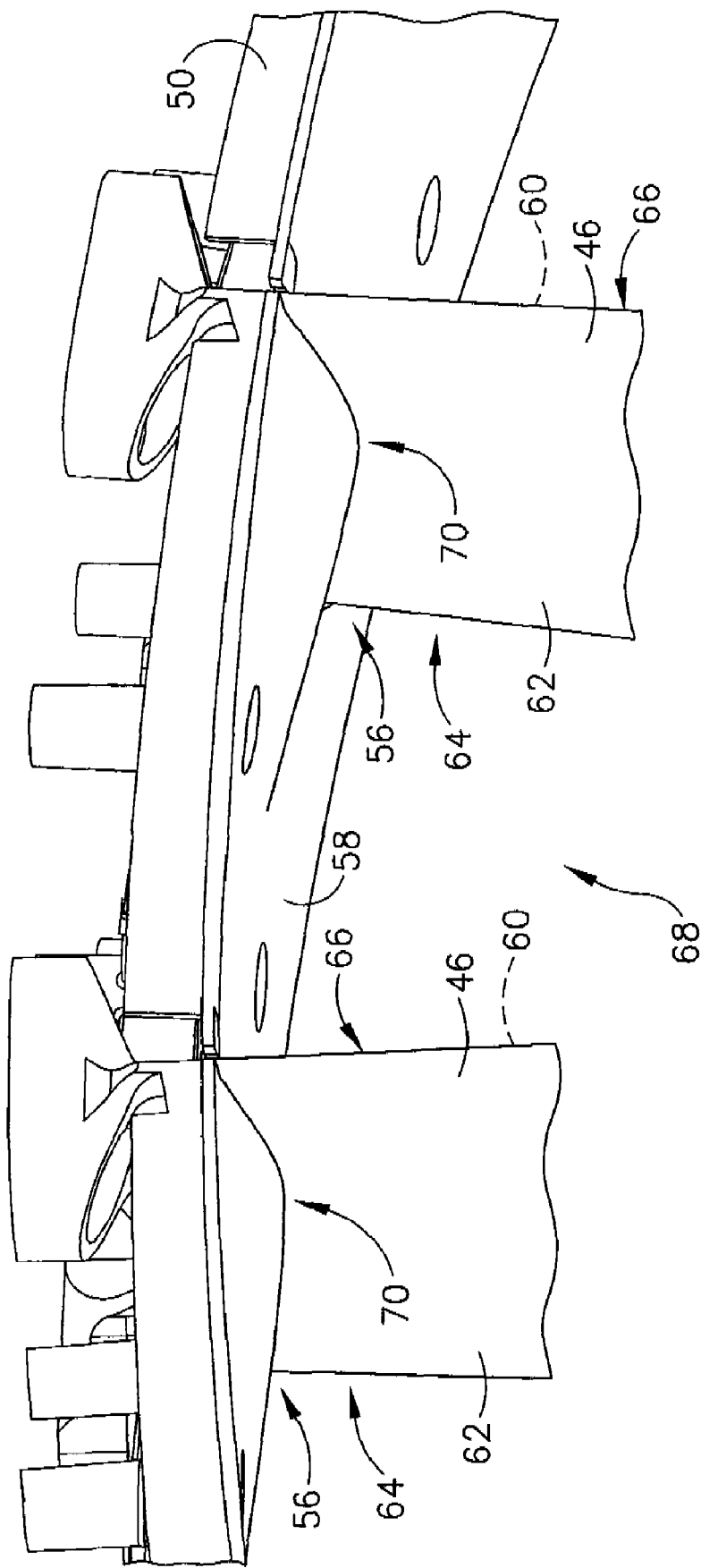
FIG. 5 is another perspective view of a portion of the portion of the blade row shown in FIGS. 3 and 4.

FIG. 3 is a perspective view of a portion of an exemplary embodiment of a blade row 44 that may be used with gas turbine engine 10 (shown in FIGS. 1 and 2), for example. FIG. 4 is another perspective view of the portion of blade row 44 shown in FIG. 3. FIG. 5 is another perspective view of a portion of the portion of blade row 44 shown in FIGS. 3 and 4. In the exemplary embodiment, blade row 44 is a stator vane assembly, such as, but not limited to, OGV 36, IGV 38, or OGV 40. In other embodiments, blade row 44 is a rotor assembly. In some embodiments, blade row 44 forms a structural component of engine 10. Blade row 44 includes a plurality of circumferentially-spaced airfoils 46, sometimes referred to as guide vanes or blades. Airfoils 46 extend substantially radially between a radially inner endwall 48 and a radially outer endwall 50. More specifically, airfoils 46 each extend from a root section 52 coupled to a radially outer surface 54 of inner endwall 48 to a tip section 56 coupled to a radially inner surface 58 of outer endwall 50. Each airfoil 46 includes a concave, or pressure side 60 and a generally opposite convex, or suction side 62 joined together at a leading edge portion 64 and a trailing edge portion 66. A channel 68 for air, or another working fluid such as, but not limited to, steam or combustion gases, is defined between each adjacent pair of airfoils 46 in blade row 44.

In some embodiments, each airfoil 46 of blade row 44 is substantially similar in size, shape, and orientation. However, in the exemplary embodiment, blade row 44 includes at least one airfoil 46 having a different size, shape, and/or orientation from one or more other airfoils 46 in blade row 44. Moreover, in some embodiments, a circumferential spacing between each pair of adjacent airfoils 46 of blade row 44 is substantially identical, while in other embodiments, circumferential spacing between each pair of adjacent airfoils 46 is variable. In some embodiments, airfoils 46 are integrally fabricated with inner endwall 48 and/or outer endwall 50. In other embodiments, airfoils 46 are fabricated separately from inner endwall 48 and/or outer endwall 50 and are thereafter coupled thereto. Moreover, in some embodiments, blade row 44 may be fabricated from a plurality of arcuate segments coupled together. In other embodiments, blade row 44 is fabricated as an integral assembly such that endwalls 48, 50 are each fabricated as one continuous substantially circular band (whether airfoils 46 are integrally formed therewith).

Between one or more pairs of adjacent airfoils 46, a projection 70 extends outward from radially inner surface 58 of outer endwall 50. More specifically, projection 70 extends radially inwardly from outer endwall inner surface 58 into channel 68, and more specifically into a flowpath of working fluid flowing through channel 68. As such, outer endwall inner surface 58 includes a non-axisymmetric shape with respect to engine centerline axis 31, for example. Projection 70 and the non-axisymmetric shape of surface 58 provided thereby facilitate extending a range of incidence over which a flow of working fluid through channel 68 remains free of separation from airfoils 46. Accordingly, projection 70 and the non-axisymmetric shape provided thereby facilitate reducing pressure loss of working fluid flowing through blade row 44. In some embodiments, each adjacent pair of airfoils 46 includes a projection 70 extending from surface 58 therebetween.

Projection 70 may have any suitable size, shape (such that outer endwall inner surface 58 may include any suitable non-axisymmetric shape), location, and/or orientation (whether described and/or illustrated herein) that enables projection 70 to function as described herein. In some embodiments wherein blade row 44 includes a plurality of projections 70, each extending between a different pair of adjacent airfoils 46, one or more projections 70 has a different size, shape, location, and or orientation from one or more other projections 70. For example, when blade row 44 includes a plurality of differently sized, shaped, located, and/or orientated airfoils 46, each projection 70 may have a size, shape, location, and/or orientation that corresponds to one or both of its adjacent pair of airfoils 46.

In the exemplary embodiment, projection 70 extends radially inward from a portion of outer endwall inner surface 58 that is adjacent convex side 62 of one of the pair of adjacent airfoils 46. For example, in the exemplary embodiment, projection 70 is closer to convex side 62 of one of the pair of adjacent airfoils 46 than concave side 60 of the other adjacent airfoil 46. Moreover, in the exemplary embodiment, projection 66 extends radially inward from a portion of outer endwall inner surface 58 that is adjacent trailing edge portion 66 of one of the pair of adjacent airfoils 46. For example, in the exemplary embodiment, projection 70 is closer to trailing edge portion 66 of airfoil 46 than leading edge portion 64 of the airfoil 46. Moreover, in the exemplary embodiment, a shape of outer endwall inner surface 58 is generally axisymmetric at leading and trailing edge portions 64, 66, respectively, and at least a portion of outer endwall inner surface 58 between leading and trailing edge portions 64, 66, respectively, is generally non-axisymmetric. In the exemplary embodiment, projection 70 is orientated and located on surface 58 such that it is at a substantially constant tangential location relative to trailing edge portion 66 of an airfoil 46. Although as discussed above projection 70 may have any suitable size, in the exemplary embodiment, projection 70 extends radially inward from surface 58 about 5% of a chord length of the most adjacent airfoil 46. For example, in the exemplary embodiment, the most adjacent airfoil 46 has a chord length of about 10 inches and projection 70 extends radially inward about 0.5 inches from surface 58.

Figure 6:
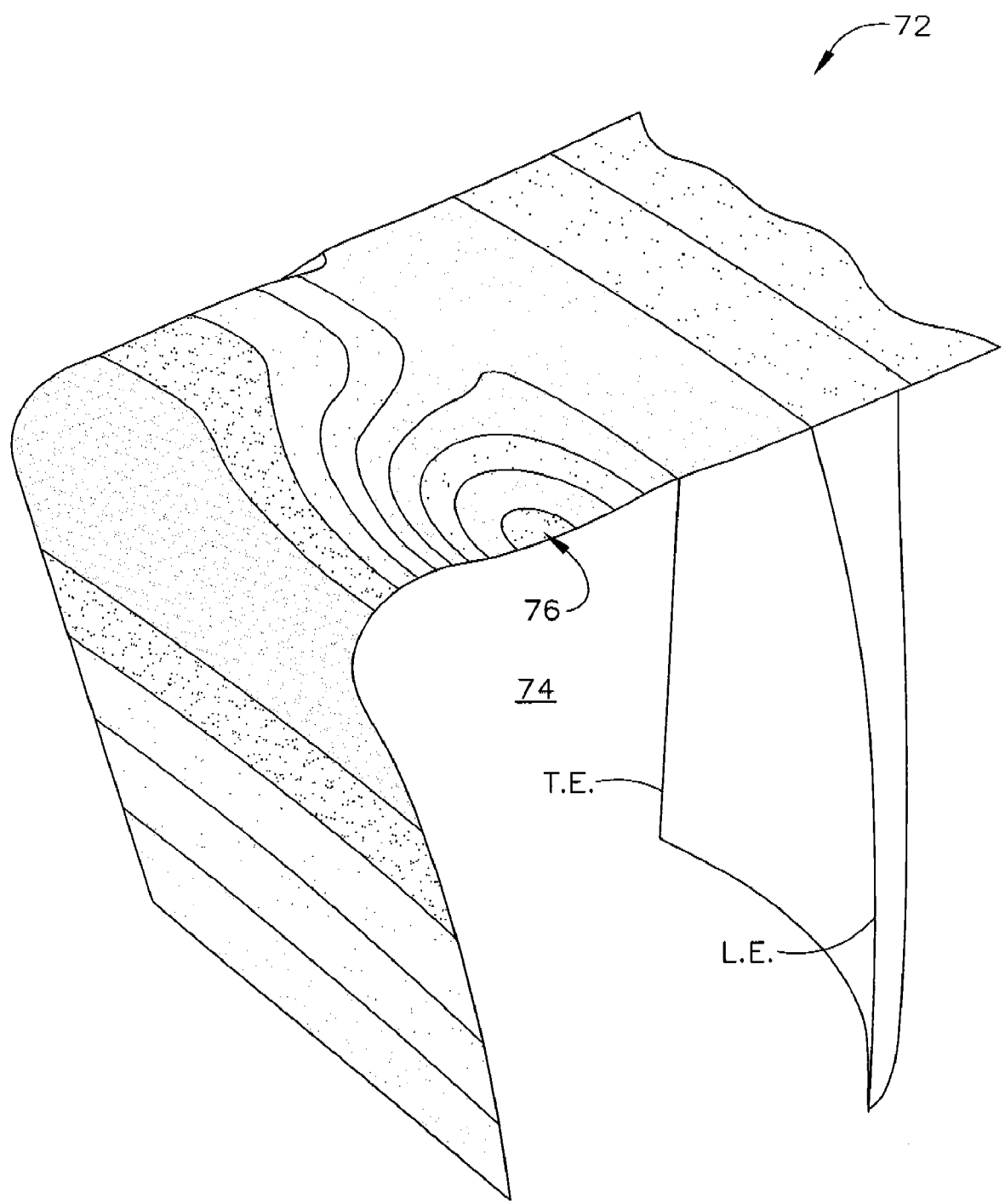
FIG. 6 is a schematic illustration of an exemplary flowpath of working fluid through the blade row shown in FIGS. 3-5.

FIG. 6 is a schematic illustration of an exemplary flowpath 72 of working fluid through blade row channel 68 (shown in FIGS. 3-5). More specifically, as working fluid flows through channel 68, a portion 74 of the flow interacts with projection 70 (shown in FIGS. 3-5 and indicated in FIG. 6 as portion 76) such that portion 74 remains substantially free of separation from airfoil 46 (shown in FIGS. 3-5) adjacent convex side 62 (shown in FIGS. 3-5) and trailing edge portion 66 (shown in FIGS. 3-5) thereof.

Blade row 44 may be fabricated using any suitable process, method, structure, and/or means. Fabrication of blade row 44 may include providing airfoil 46 including root section 52 coupled to radially inner endwall 48 and tip section 56 coupled to radially outer endwall 50, and forming projection 70 extending radially inward from radially inner surface 58 of radially outer endwall 50. In some embodiments, when a plurality of projections 70 are formed, wherein each projection 70 extends between a different pair of adjacent airfoils 46, the plurality of projections 70 are formed using the same production tool, such as, but not limited to, an injection molding tool (not shown) or machine tool (not shown).

The herein described and illustrated projection 70 and non-axisymmetric shape of surface 58 facilitate extending a range of incidence over which a flow of working fluid remains free of separation from airfoils 46 without span-wise modifications to a sweep, dihedral, and/or camber of airfoils 46. As such, projection 70 and the non-axisymmetric shape provided thereby may facilitate reducing pressure loss of working fluid flowing through blade row 44 without compromising structural design and/or noise considerations.

Although the methods and blade rows described and/or illustrated herein are described and/or illustrated with respect to a gas turbine engine, and more specifically a stator vane assembly for a gas turbine engine, practice of the embodiments described and/or illustrated herein is not limited to stator assemblies, nor gas turbine engines. Rather, the methods and blade rows described and/or illustrated herein are applicable to any rotor or stator assembly for any rotary machine.

Exemplary embodiments of methods and blade rows are described and/or illustrated herein in detail. The methods and blade rows are not limited to the specific embodiments described herein, but rather, steps of each method and components of each blade row may be utilized independently and separately from other steps and/or components described herein. Each method step and component can also be used in combination with other method steps and/or components.

When introducing elements/components/steps/etc. of the methods and blade rows described and/or illustrated herein, the articles "a", "an", "the", "said", and "at least one" are intended to mean that there are one or more of the element(s)/component(s)/step(s)/etc. The terms "comprising", "including" and "having" are intended to be inclusive and mean that there may be additional element(s)/component(s)/step(s)/etc. other than the listed element(s)/component(s)/step(s) etc.

While the invention has been described in terms of various specific embodiments, those skilled in the art will recognize that the invention can be practiced with modification within the spirit and scope of the claims.

What is claimed is:

1. A blade row for a rotary machine defining a flow path along an axis of the rotary machine, said blade row comprising:
    a radially inner endwall;
    a casing component comprising a radially outer endwall opposite said radially inner endwall; and
    a plurality of differently shaped airfoils arranged in pairs of adjacent airfoils and extending between said radially inner endwall and said radially outer endwall, said plurality of differently shaped airfoils comprising a first airfoil and a second airfoil, each of said first and second airfoils comprising a root section adjacent said radially inner endwall, a tip section adjacent said radially outer endwall, a convex side, a concave side, a leading edge, and a trailing edge such that a channel of the flow path is defined between said convex side of said first airfoil and said concave side of said second airfoil, said casing component comprising a single projection extending radially into the channel between said convex side of said first airfoil and said concave side of said second airfoil such that said casing component comprises a non-axisymmetric shape, said projection positioned closer to said convex side of said first airfoil than to said concave side of said second airfoil and closer to said trailing edge of said first airfoil than to said leading edge of said first airfoil, each of said pairs of adjacent airfoils being associated with a differently shaped single projection.

2. A blade row in accordance with claim 1 wherein said radially inner surface comprises an axisymmetric shape adjacent said leading and trailing edges of said first and second airfoils.

3. A blade row in accordance with claim 1 wherein said blade row is a stator vane assembly.

4. A blade row in accordance with claim 3 wherein said blade row is one of an inlet guide vane (IGV) assembly and an outlet guide vane (OGV) assembly.

5. A rotary machine defining a flow path along an axis of the rotary machine, said rotary machine comprising:
    a rotor assembly rotatable about the axis; and
    a blade row comprising a radially inner endwall, a casing component comprising a radially outer endwall opposite said radially inner endwall, and a plurality of differently shaped airfoils arranged in pairs of adjacent airfoils and extending between said radially inner endwall and said radially outer endwall, said plurality of differently shaped airfoils comprising a first airfoil and a second airfoil, each of said first and second airfoils comprising a root section adjacent said radially inner endwall, a tip section adjacent said radially outer endwall, a convex side, a concave side, a leading edge, and a trailing edge such that a channel of the flow path is defined between said convex side of said first airfoil and said concave side of said second airfoil, said casing component comprising a single projection extending radially into the channel between said convex side of said first airfoil and said concave side of said second airfoil such that said casing component comprises a non-axisymmetric shape, said projection positioned closer to said convex side of said first airfoil than to said concave side of said second airfoil and closer to said trailing edge of said first airfoil than to said leading edge of said first airfoil, each of said pairs of adjacent airfoils being associated with a differently shaped single projection.

6. A rotary machine in accordance with claim 5 wherein said radially inner surface comprises an axisymmetric shape adjacent said leading and trailing edges of said first and second airfoils.

7. A rotary machine in accordance with claim 5 wherein said blade row is a stationary vane assembly.

8. A rotary machine in accordance with claim 7 wherein said blade row is one of an outlet guide vane (OGV) assembly and an inlet guide vane (IGV) assembly.

9. A rotary machine in accordance with claim 5 wherein said rotary machine is a gas turbine engine.

10. A method for fabricating a blade row for a rotary machine defining a flow path along an axis of the rotary machine, said method comprising:
    providing a blade row comprising a plurality of differently shaped airfoils arranged in pairs of adjacent airfoils comprising a first airfoil and a second airfoil, each of the first and second airfoils including a root section, a tip section, a convex side, a concave side, a leading edge, and a trailing edge, such that a channel of the flow path is defined between the convex side of the first airfoil and the concave side of the second airfoil; and
    coupling the blade row to a casing component adjacent the tip sections of the first and second airfoils, the casing component including a single projection extending radially into each channel between the convex side of the first airfoil and the concave side of the second airfoil such that the casing component has a non-axisymmetric shape, the projection positioned closer to the convex side of the first airfoil than to the concave side of the second airfoil and closer to the trailing edge of the first airfoil than to the leading edge of the first airfoil such that each of the pairs of adjacent airfoils is associated with a differently shaped single projection.

11. A method in accordance with claim 10 further comprising forming the differently shaped single projections using the same production tool.

* * * * *